United States Patent [19]

Hanaki et al.

[11] Patent Number: 5,270,941
[45] Date of Patent: Dec. 14, 1993

[54] NUMERICAL CONTROL APPARATUS WITH SUPERIMPOSING CONTROL FUNCTION

[75] Inventors: Yoshimaro Hanaki; Keiichi Ota, both of Niwa, Japan

[73] Assignee: Kabushiki Kaisha Okuma Tekkosho, Aichi, Japan

[21] Appl. No.: 645,735

[22] Filed: Jan. 25, 1991

[30] Foreign Application Priority Data

Jan. 31, 1990 [JP] Japan ................... 2-21241

[51] Int. Cl.⁵ ................. G06F 15/46; G05B 19/18
[52] U.S. Cl. ................ 364/474.35; 364/474.11; 318/625
[58] Field of Search ............ 364/474.11, 474.12, 364/474.15, 474.19, 474.2, 474.21, 474.32, 474.33, 474.34, 474.35; 318/567, 568.1, 625

[56] References Cited

U.S. PATENT DOCUMENTS

| | | | |
|---|---|---|---|
| 4,590,572 | 5/1986 | Imanishi | 364/474.11 |
| 4,794,514 | 12/1988 | Hideaki et al. | 364/474.21 |
| 4,878,172 | 10/1989 | Matsumura | 364/474.11 |
| 4,987,354 | 1/1991 | Saitoh | 364/474.11 |
| 5,013,989 | 5/1991 | Kurakake et al. | 318/625 |
| 5,025,200 | 6/1991 | Kurakake et al. | 318/625 |
| 5,079,713 | 1/1992 | Kawamura et al. | 364/474.2 |
| 5,083,072 | 1/1992 | Song | 364/474.35 |

Primary Examiner—Jerry Smith
Assistant Examiner—Thomas E. Braun
Attorney, Agent, or Firm—Wenderoth, Lind & Ponack

[57] ABSTRACT

A numerical control apparatus for controlling a numerical lathe has a superimposing Z-axis control function in which, when a work is machined by the control of movement of a tool holder in the Z2- and X2-axis directions driving movement of a spindle in the Z1-axis direction, the variance of the position of the spindle in the Z1-axis direction as detected by a Z1-axis position detector is added to the value derived from a Z2-axis position detector which detects the position of the tool holder in the Z2-axis direction, and the position of the second tool holder in the Z2-axis direction is controlled using the result of the addition as the feedback value of the Z2-axis position of the second tool holder. According to this arrangement, the variance of the position of the spindle in the Z1-axis direction is always added to the detection value of the tool holder position in the Z2-axis direction, thus producing the same effect as that produced by an arrangement in which tool holders and Z2-axis driving mechanism and X2-axis driving mechanism for controlling the positions of these tool holders are carried by the spindle so that the tool holders, as well as the Z2-axis and X2-axis driving mechanisms are automatically moved in accordance with the movement of the spindle in the X1-axis direction.

1 Claim, 3 Drawing Sheets

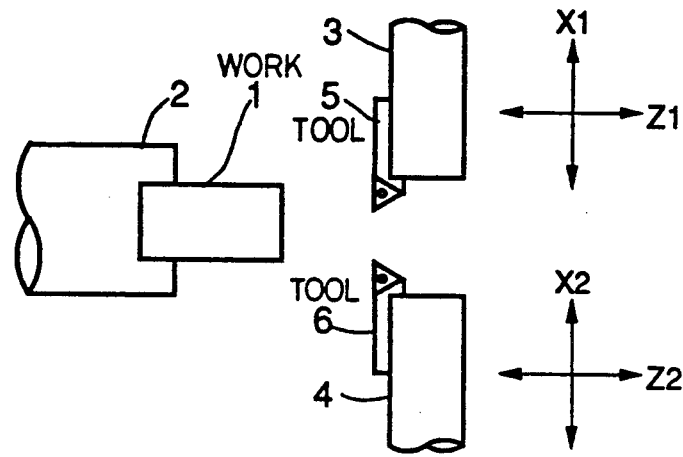
PRIOR ART FIG.1
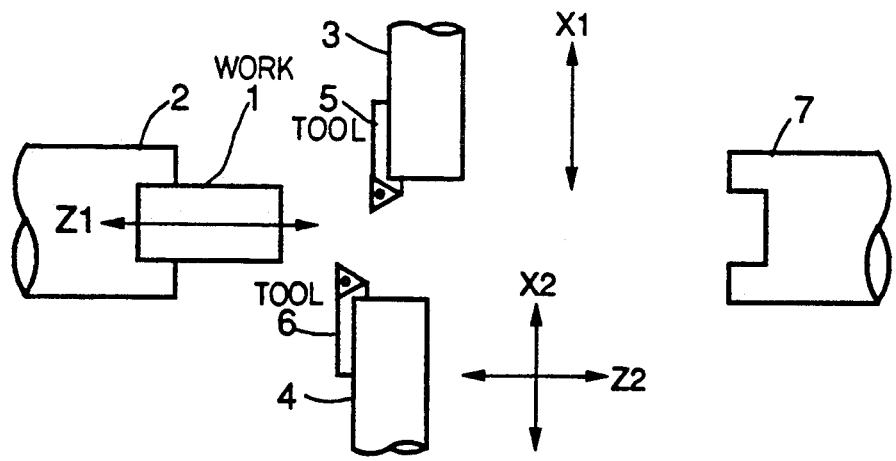
PRIOR ART FIG.2

NUMERICAL CONTROL APPARATUS WITH SUPERIMPOSING CONTROL FUNCTION

BACKGROUND OF THE INVENTION

The present invention relates to a numerical control apparatus having a superimposing control function for conducting a superimposing X-axis control of a numerical control lathe.

FIG. 1 shows an arrangement of components of a conventional 4-axis numerical control lathe. A work 1 is held by a spindle 2 which is adapted to be rotated about an axis. A tool holder 3 is adapted to be controlled to move both in the directions of X1- and Z1-axes to enable a tool 5 on the tool holder 3 to machine a work 1. Another tool holder 4 is controlled for movement both in the directions of X2- and Z2-axes to enable a tool 6 carried by the tool holder 4 to machine the work 1.

A numerical control lathe has been developed recently, which has a mechanical construction as shown in FIG. 2. This modern numerical control lathe is different from the conventional numerical control lathe of FIG. 1 in that it has an additional spindle 7 and in that the spindle 2 is controllable in the direction of the axis of rotation (Z1-axis direction), while the tool holder 3 is controllable only in the direction of the X1-axis. Since the spindle 2 is movable, advantages are brought about such as possibility of direct delivery of a work 1 on the spindle 2 to another spindle 7 which opposes the spindle 2.

The mechanical arrangement shown in FIG. 2, however, suffers from the following problem. Namely, the movement of the spindle 2 in the direction of the Z1-axis during machining of the work 1 by the tool 6 on the tool holder 4 requires that the movement of the tool holder 4 in the direction of the Z2-axis has to be conducted while taking into account the amount of movement of the spindle 2 in the direction of the Z1-axis. That is, the movement of the tool holder 4 in the direction of the Z2-axis has to be controlled in superimposition to the control of the spindle 2 in the direction of the Z1-axis.

A description will be now given of a conventional art for conducting superimposing control on the Z-axis, with reference to FIG. 3.

A machining program read from a machining program storage section 10 is interpreted by a program interpreting section 11 and the interpreted program is sent to a Z1/X1-axes computing section 12 and a Z2/X2-axes computing section 13. Each of the computing sections 12 and 13 conducts a computation for the position control so that position commands for the X1-axis, the Z1-axis and the X2-axis are delivered to an X1-axis servo control section 14, a Z1-axis servo control section 15 and an X2-axis servo control section 16, respectively. The position command PS delivered to the Z1-axis servo control section 15 is sent also to a variance computing section 26 which computes the variance VA of the command value PS. The variance VA thus computed is delivered to an adding section 27. The adding section 27 then operates to add the variance VA to the Z-axis position command PS derived from the Z2/X2-axes computing section 13, and delivers the addition data AD representing the result of the addition to the Z1-axis servo control section 17. Upon receipt of these position commands, the servo control sections 14 to 17 drive the servo motors 18 to 21 so as to effect the control of the positions in the directions of the respective axes with feedback of position data from position detectors 22 to 25 which are respectively connected to the servo motors 18 to 21.

Thus, in the conventional superimposing control, the variance VA in the movement command PS of the spindle 2 in the Z1-axis direction is added to the Z2-axis position command PC. In this control method, controls of the servo systems for the movement in the Z1- and Z2-axes are conducted completely independent from each other. This poses the following problem. Namely, if the movement in the Z1-axis could not be conducted correctly due to any abnormality occurring in the Z1-axis servo control, the movement in the Z2-axis direction also is conducted in a wrong manner with respect to the work 1, since no means are provided for enabling the Z2-axis control system to recognize the abnormality occurring in the Z1-axis servo control, causing a risk of triggering a serious accident.

Thus, in the control system of a numerical control lathe of the type in which a spindle moves in the Z1-axis direction and a first tool holder moves only in X1-axis direction while a second tool holder moves both in X2- and Z2-axis directions, when a machining is conducted with the tool on the second tool holder during movement of the spindle, it is necessary to conduct a superimposing control for determining the movement of the second tool holder in the Z2-axis direction taking into account the movement of the spindle in the Z1-axis direction. Conventionally, this superimposing control is conducted by using position commands. i.e., by adding the variation in the Z1-axis movement command to the position command of the Z2-axis movement, so that the movement of the second tool holder in the Z2-axis direction becomes out of control in the event of occurrence of abnormality in the Z1-axis servo control system, failing to correctly machine the work.

SUMMARY OF THE INVENTION

Accordingly, an object of the present invention is to provide a numerical control system having a superimposing control function which is improved to avoid occurrence of serious accident in the event of an abnormality taking place in the Z1-axis servo system.

To this end, according to the present invention, there is provided a numerical control apparatus for controlling a numerical lathe of the type having a spindle for carrying a work and movable at least in the direction of Z1-axis which is the axis of rotation of the spindle, a first tool holder movable in an X1-axis direction which is perpendicular to the Z1-axis and a second tool holder movable in Z2- and X2-axis directions which are respectively parallel to the Z1-axis and the X1-axis, the numerical control apparatus comprising: a superimposing control function in which, when a work is machined by the control of movement of the second tool holder in the Z2- and X2-axis directions during movement of the spindle in the Z1-axis direction, the variance of the position of the spindle in the Z1-axis direction as detected by a Z1-axis position detector is added to the value derived from a Z2-axis position detector which detects the position of the second tool holder in the Z2-axis direction, and the position of the second tool holder in the Z2-axis direction is controlled using the result of the addition as the feedback value of the Z2-axis position of the second tool holder, thereby conducting a Z-axis superimposing control.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is an illustration of a mechanical arrangement of a conventional 4-axis numerical control lathe;

FIG. 2 is an illustration of a mechanical arrangement of a known numerical control lathe which requires a superimposing control;

DESCRIPTION OF THE PREFERRED EMBODIMENT

Figure 3:
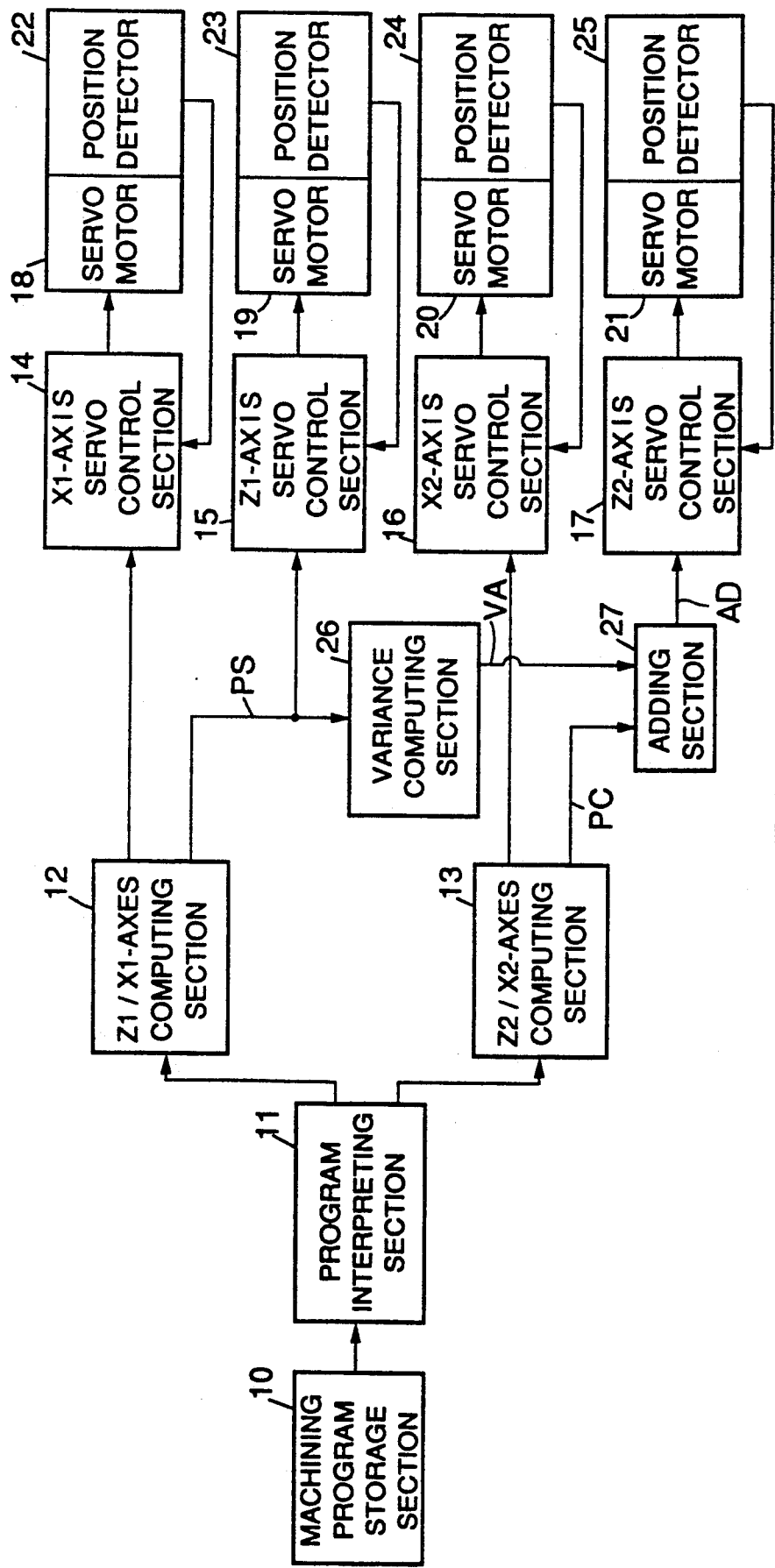
FIG. 3 is a block diagram of a known control system.
Figure 4:
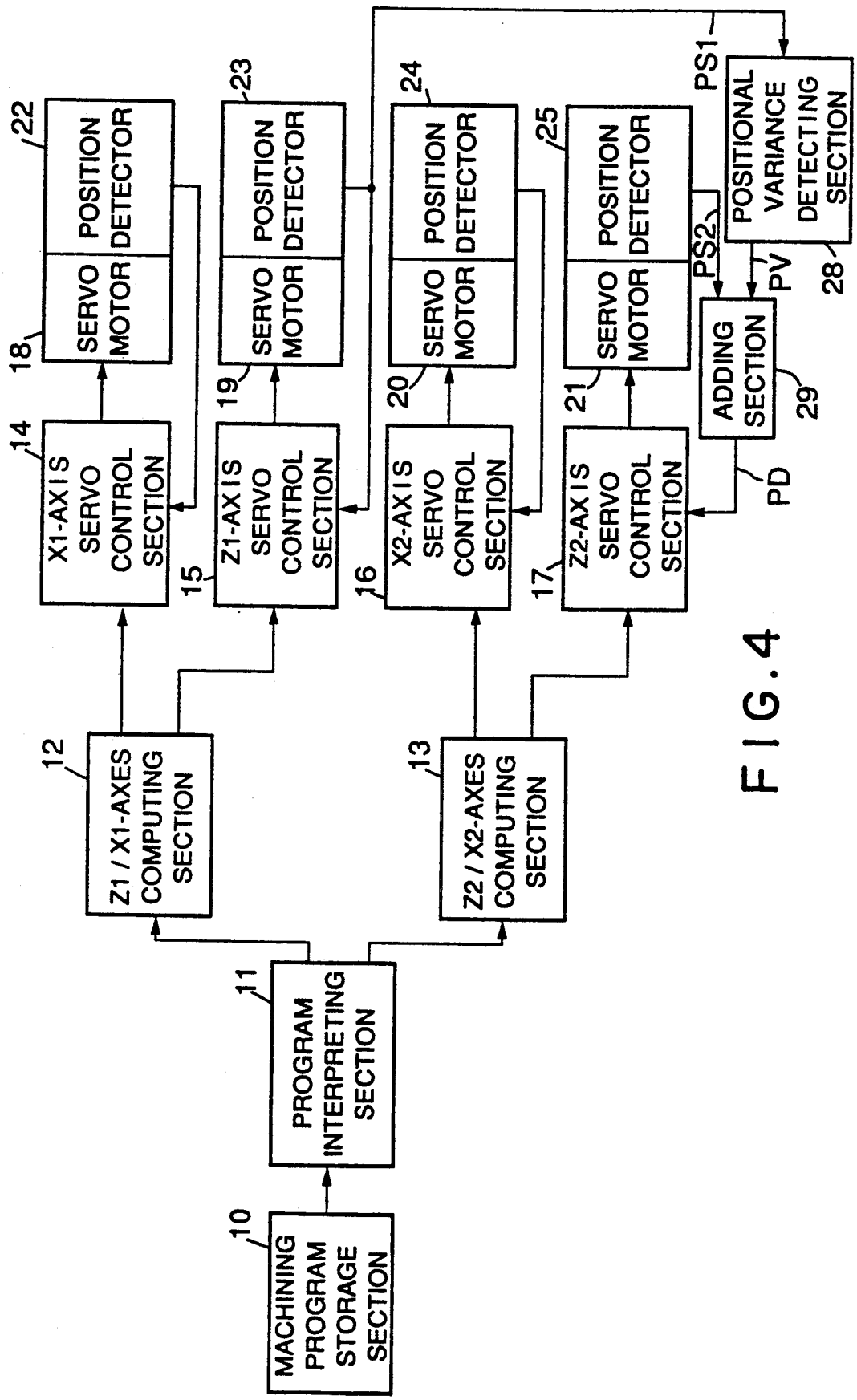
FIG. 4 is a block diagram of an embodiment of the present invention.

An embodiment of the present invention will be described with reference to FIG. 4 in which the same reference numerals are used to denote the same components as those appearing in FIG. 3.

In this embodiment, the computation output from the Z1/X1-axes computing section 12 is respectively input to the X1-axis servo control section 14 and the Z1-axis servo control section 15. On the other hand, the computation output from the Z2/X2-axes computing section 13 is delivered to the X2-axis servo control section 16 and the Z2-axis servo control section 17, respectively. The position detection value PS1 of the Z1-axis position detector 23 is input to a positional variance detecting section 28. The position variance PV detected by the positional variance detecting section 28 and a position detection value PS1 from the Z2-axis position detector 25 are input to an adding section 29. The result PD of the addition is input to the Z2-axis servo control section 17.

Thus, in the illustrated embodiment of the present invention, the position detection value PS1 detected by the Z1-axis position detector 23 is delivered not only to the Z1-axis servo control section 15 but also to the positional variance detecting section 28, so that the position variance PV is detected by the positional variance detecting section 28 and delivered to the adding section 29. The adding section 29 adds the position variance PV to the position detection value PS2 obtained by the Z2-axis position detector 25 and delivers the result PD of the addition as the Z2-axis position detection value to the Z2-axis servo control section 17 thereby effecting a Z2-axis position control.

As has been described, in the illustrated embodiment of the present invention, the positional variance in the X1-axis direction is always added to the Z2-axis position detection value. This produces the same effect as that produced by an arrangement in which tool holders and Z2-axis driving mechanism and X2-axis driving mechanism for controlling the positions of these tool holders are carried by the spindle so that the tool holders, as well as the Z2-axis and X2-axis driving mechanisms are automatically moved in accordance with the movement of the spindle in the Z1-axis direction. Consequently, any trouble occuring in the Z1-axis servo system does not lead to a series accident.

It should be understood that many modifications and adaptations of the invention will become apparent to those skilled in the art and it is intended to encompass such obvious modifications and changes in the scope of the claims appended hereto.

What is claimed is:

1. A numerical control apparatus for controlling a numerical lathe of the type having a spindle for carrying a work and movable at least in a direction of Z1-axis which is an axis of rotation of said spindle, a first tool holder movable in an X1-axis direction which is perpendicular to said Z1-axis and a second tool holder movable in Z2-axis and X2-axis directions which are respectively parallel to said Z1 axis and X1-axis, said numerical control apparatus comprising: a superimposing control function in which, when a work is machined by the control of movement of said second tool holder in said Z2-axis and X2-axis directions during movement of said spindle in the Z1-axis direction, the variance of the position of said spindle in said Z1-axis direction as calculated from the position detected by a Z1-axis position detector by a positional variance detecting means, is added by an adding means to a value derived from a Z2-axis position detector which detects the position of said second tool holder in the Z2-axis direction, and the position of said second tool holder in said Z2-axis direction is controlled by a control means using a result of the addition of the Z2-axis position of said second tool holder used as a feedback signal, thereby effecting a superimposing control function.

* * * * *